(12) United States Patent
Kawahara et al.

(10) Patent No.: US 10,339,930 B2
(45) Date of Patent: Jul. 2, 2019

(54) VOICE INTERACTION APPARATUS AND AUTOMATIC INTERACTION METHOD USING VOICE INTERACTION APPARATUS

(71) Applicants: KYOTO UNIVERSITY, Kyoto-shi, Kyoto (JP); TOYOTA JIDOSHA KABUSHIKI KAISHA, Toyota-shi, Aichi-ken (JP)

(72) Inventors: Tatsuya Kawahara, Kyoto (JP); Katsuya Takanashi, Kyoto (JP); Ryosuke Nakanishi, Toyota (JP); Narimasa Watanabe, Nagakute (JP)

(73) Assignees: TOYOTA JIDOSHA KABUSHIKI KAISHA, Toyota-shi, Aichi-ken (JP); KYOTO UNIVERSITY, Kyoto-shi, Kyoto (JP)

(*) Notice: Subject to any disclaimer, the term of this patent is extended or adjusted under 35 U.S.C. 154(b) by 0 days.

(21) Appl. No.: 15/695,090

(22) Filed: Sep. 5, 2017

(65) Prior Publication Data

US 2018/0068660 A1    Mar. 8, 2018

(30) Foreign Application Priority Data

Sep. 6, 2016   (JP) .................................. 2016-173862

(51) Int. Cl.
*G10L 15/22*     (2006.01)
*G10L 15/26*     (2006.01)

(52) U.S. Cl.
CPC .............. *G10L 15/22* (2013.01); *G10L 15/26* (2013.01); *G10L 2015/225* (2013.01)

(58) Field of Classification Search
None
See application file for complete search history.

(56) References Cited

U.S. PATENT DOCUMENTS 7,809,569 B2* 10/2010 Attwater ................. G10L 15/08
704/231
8,340,971 B1* 12/2012 Abella .................. H04M 3/493
704/1

(Continued)

FOREIGN PATENT DOCUMENTS

JP    2009-003040 A    1/2009
JP    2016-038501 A    3/2016

OTHER PUBLICATIONS

Cognitive Science Research Paper, 2000, p. 93-106, vol. 7, No. 1.

*Primary Examiner* — Fariba Sirjani
(74) *Attorney, Agent, or Firm* — Sughrue Mion, PLLC

(57) ABSTRACT

Provided is a voice interaction apparatus including an estimation unit configured to estimate whether to wait a next user's speech or to execute an output of an output speech by the voice interaction apparatus based on a user's speech input by an input unit; and the response control unit configured to, when the estimation unit could not estimate whether to wait for the user's next speech or to execute the output of the output speech by the voice interaction apparatus, respond by executing at least one of a filler output and a nodding action, the filler output being an output of a filler, i.e., a connecting utterance irrelevant to an interaction content, from the output unit, and the nodding action being an action of swinging a pseudo head part back and forth.

6 Claims, 13 Drawing Sheets

(56) References Cited

U.S. PATENT DOCUMENTS

| | | | |
|---|---|---|---|
| 8,645,122 B1* | 2/2014 | Di Fabbrizio | G10L 21/00 704/231 |
| 8,843,372 B1* | 9/2014 | Isenberg | G10L 17/26 704/250 |
| 9,443,521 B1* | 9/2016 | Olguin Olguin | G10L 17/00 |
| 9,576,574 B2* | 2/2017 | van Os | G10L 15/22 |
| 10,121,493 B2* | 11/2018 | Aravamudan | G10L 25/54 |
| 2002/0077826 A1* | 6/2002 | Hinde | G10L 15/30 704/270 |
| 2003/0061029 A1* | 3/2003 | Shaket | G06F 17/279 704/9 |
| 2004/0122673 A1* | 6/2004 | Park | G10L 15/22 704/270 |
| 2005/0182618 A1* | 8/2005 | Azara | G06F 17/279 704/9 |
| 2006/0122840 A1* | 6/2006 | Anderson | G10L 13/033 704/275 |
| 2007/0015121 A1* | 1/2007 | Johnson | G09B 7/02 434/156 |
| 2009/0041212 A1* | 2/2009 | Erhart | H04M 3/2281 379/88.16 |
| 2009/0287678 A1* | 11/2009 | Brown | G06F 17/28 |
| 2009/0319270 A1* | 12/2009 | Gross | G10L 15/22 704/246 |
| 2012/0130716 A1* | 5/2012 | Kim | B25J 13/003 704/256.1 |
| 2012/0130717 A1* | 5/2012 | Xu | G06T 13/40 704/258 |
| 2014/0036022 A1* | 2/2014 | Croen | H04N 7/147 348/14.01 |
| 2014/0288932 A1* | 9/2014 | Yeracaris | G10L 15/30 704/249 |
| 2015/0006171 A1* | 1/2015 | Westby | G10L 15/26 704/235 |
| 2015/0066479 A1* | 3/2015 | Pasupalak | G06F 17/27 704/9 |
| 2017/0061968 A1* | 3/2017 | Dalmasso | G10L 17/08 |
| 2017/0330077 A1* | 11/2017 | Williams | G06F 17/278 |
| 2017/0352351 A1* | 12/2017 | Kimura | A63H 5/00 |
| 2018/0218080 A1* | 8/2018 | Krishnamurthy | G06F 17/2785 |

* cited by examiner

| CHANGE PROBABILITY P | 0.0-0.5 | 0.5-0.8 | 0.8-1.0 |
|---|---|---|---|
| RESPONSE TYPE | NO RESPONSE | FILLER UTTERANCE | RESPONSE SPEECH |

Fig. 3

| CHANGE PROBABILITY P | 0.0-0.5 | 0.5-0.8 | 0.7-1.0 |
|---|---|---|---|
| RESPONSE TYPE | NO RESPONSE | FILLER UTTERANCE | RESPONSE SPEECH |

Fig. 5

| CHANGE PROBABILITY P | 0.0-0.4 | 0.4-0.5 | 0.5-0.8 | 0.8-1.0 |
|---|---|---|---|---|
| RESPONSE TYPE | NO RESPONSE | BACKCHANNEL | FILLER UTTERANCE | RESPONSE SPEECH |

Fig. 8

| CHANGE PROBABILITY P | 0.0–0.4 | 0.3–0.5 | 0.5–0.8 | 0.7–1.0 |
|---|---|---|---|---|
| RESPONSE TYPE | NO RESPONSE | BACKCHANNEL | FILLER UTTERANCE | RESPONSE SPEECH |

Fig. 10

VOICE INTERACTION APPARATUS AND AUTOMATIC INTERACTION METHOD USING VOICE INTERACTION APPARATUS

CROSS REFERENCE TO RELATED APPLICATIONS

This application is based upon and claims the benefit of priority from Japanese patent application No. 2016-173862, filed on Sep. 6, 2016, the disclosure of which is incorporated herein in its entirety by reference.

BACKGROUND

The present disclosure relates to a voice interaction apparatus and an automatic interaction method using the voice interaction apparatus.

The technique for enabling users to enjoy everyday conversations with voice interactive robots is becoming widespread. For example, as a technique for realizing a conversation with no unnatural impression, a technique is known in which an interactive robot makes a backchannel response at appropriate timings by analyzing prosody of a user's speech (see Japanese Unexamined Patent Application Publication No. 2009-3040). Further, studies have been conducted on seeking timings at which a speaker is changed between a user and a robot (see Cognitive Science Research Paper Vol. 7 (2000) No. 1, pp. 93-106).

SUMMARY

There have been cases where it is difficult to make a clear evaluation, from an analysis of the prosody of the user's speech, about whether the interactive robot should make a next speech or wait for the user's speech. In such a case, the silence between the interactive robot and the user continues, or their speeches overlap, which hinders the user from enjoying a smooth conversation.

The present disclosure has been made to solve such a problem and provides a technique for achieving smooth conversations between the interactive robot as an example of a voice interaction system and the user.

A first example aspect of the present disclosure is a voice interaction apparatus including: an input unit configured to input an input speech spoken by a user; an output unit configured to output an output speech spoken to the user; an estimation unit configured to estimate whether to wait for the input of the input speech by the input unit or to execute the output of the output speech by the output unit based on the input speech input by the input unit; and the response control unit configured to, when the estimation unit could not estimate whether to wait for the input of the input speech by the input unit or to execute the output of the output speech by the output unit, respond by executing at least one of a filler output and a nodding action, the filler output being an output of a filler from the output unit, the filler being a connecting utterance irrelevant to an interaction content, and the nodding action being an action of swinging a pseudo head part back and forth.

A second example aspect of the present disclosure is an automatic interaction method using a voice interaction apparatus comprising an input unit configured to input an input speech spoken by a user and an output unit configured to output an output speech spoken to the user. The automatic interaction method includes: estimating whether to wait for the input of the input speech by the input unit or to execute the output of the output speech by the output unit based on the input speech input by the input unit; and responding by executing, when it could not have been estimated in the estimating whether to wait for the input of the input speech by the input unit or to execute the output of the output speech by the output unit, at least one of a filler output and a nodding action, the filler output being an output of a filler from the output unit, the filler being a connecting utterance irrelevant to an interaction content, and the nodding action being an action of swinging a pseudo head part back and forth.

According to configurations of the above example aspects, it is possible to imply that the voice interaction apparatus has a speech right by an utterance of a filler or to prompt the user to speak by the nodding action, thereby preventing the silence between the voice interaction apparatus and the user from continuing or their speeches from overlapping.

According to the present disclosure, it is possible to achieve smooth conversations between the voice interaction system and the user.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 3 is a diagram showing a response determination table according to the first embodiment;

FIG. 5 is a diagram showing a response determination table according to a second embodiment;

FIG. 8 is a diagram showing a response determination table according to the third embodiment;

FIG. 10 is a diagram showing a response determination table according to a fourth embodiment;

DESCRIPTION OF EMBODIMENTS

Hereinafter, although the present disclosure will be described with reference to embodiments of the invention, the present disclosure according to claims is not limited to the following embodiments. Moreover, all the components described in the following embodiments are not necessarily indispensable for means to solve problems.

Figure 1:
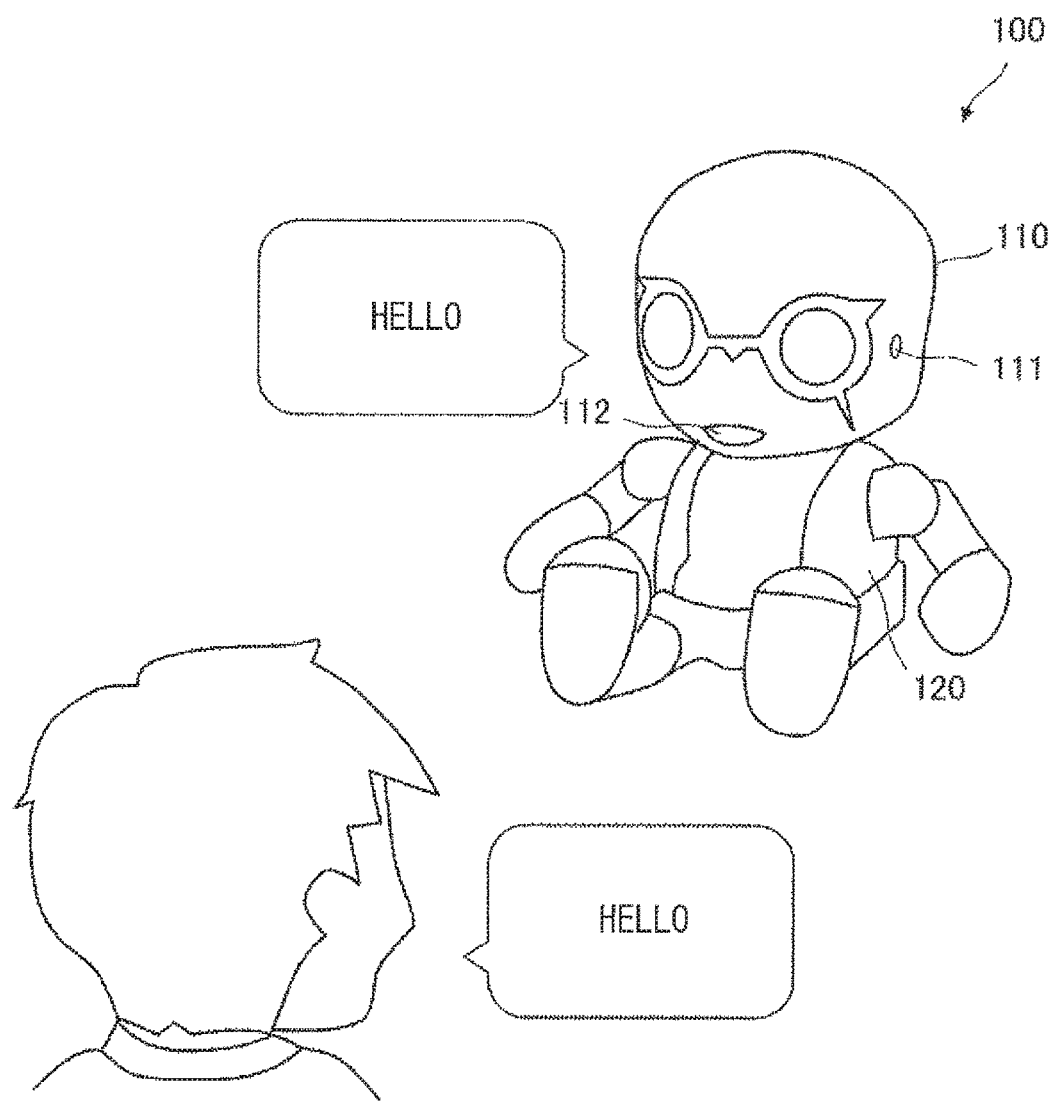
FIG. 1 is a diagram showing a state where a user is having a conversation with an interactive robot according to the present disclosure.

FIG. 1 is a diagram showing a state where a user is having a conversation with an interactive robot 100 according to the present disclosure. The interactive robot 100 is a form of a voice interaction apparatus and responds according to a user's speech. The interactive robot 100 has a housing that simulates, for example, a living thing such as a human being to reduce an inorganic impression given to the user. As shown in FIG. 1, the interactive robot 100 has an external appearance in which a pseudo head part 110 is disposed on a body part 120 including limbs. On the head part 110, a microphone 111 is arranged around a temporal head where an ear is supposed to be located. The microphone 111 collects the user's speeches. A speaker 112 is disposed in a pseudo mouth. The speaker 112 speaks and utters responses generated by the interactive robot 100. In the following descriptions, a voice having a meaning as an interaction content is referred to as a "speech" and a connecting voice irrelevant to the interaction content is referred to as an "utterance". When there is no need to distinguish between the terms "speech" and "utterance" in particular, they may be collectively referred to as a "speech".

Figure 2:
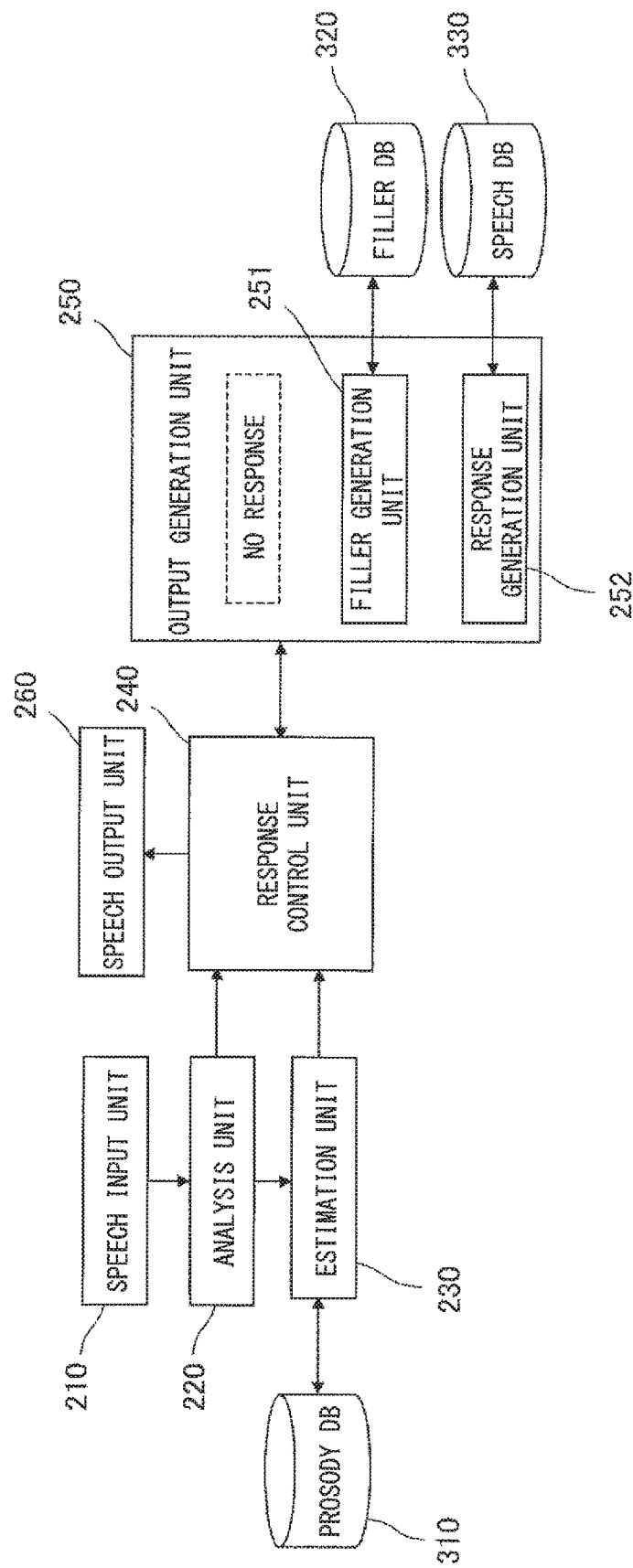
FIG. 2 is a diagram showing a system configuration of an interactive robot according to a first embodiment.

FIG. 2 is a diagram showing a system configuration of the interactive robot 100 according to the first embodiment of the present disclosure. The interactive robot 100 includes, as main functional elements, a speech input unit 210, an analysis unit 220, an estimation unit 230, a response control unit 240, an output generation unit 250, and a speech output unit 260.

The speech input unit 210 includes the microphone 111. The speech input unit 210 collects user's speeches, converts them into digital signals, and passes the digital signals to the analysis unit 220. The analysis unit 220 analyzes the prosody of the user's speeches received as the digital signals. The prosody is a representation of physical features of the speeches captured in sound waves.

The analysis of the prosody is a process of calculating, for example, a fundamental frequency and its fluctuation band, a maximum value and an average value of amplitudes as features in a group of sound waves emitted by a user, and converting them into numerical values. The analysis unit 220 divides the received digital signal into window widths of, for example, 25 msec each and uses each of the divided windows as the group of sound waves to calculate the respective features therein. Then, the analysis unit 220 sequentially shifts the windows with a delay time of, for example, 10 msec, calculates the features in each of the shifted windows, and then consecutively passes the calculated features to the estimation unit 230.

Further, the analysis unit 220 predicts a break point in the user's speeches from a change in the prosody and outputs a timing of the break point to the response control unit 240. The break point in the speeches is a separator in a series of conversations. The analysis unit 220 predicts the break point from a reduction in an amplitude level or from intonation of sentence ending.

The estimation unit 230 estimates as to whether to wait for a user's speech or the interactive robot 100 should speak based on the received physical features representing the prosody. To be more specific, in the present disclosure, the estimation unit 230 calculates a change probability P, which is a probability that a speaker will be transferred from the user to the interactive robot 100, as an estimation value. The change probability P=0 means that the user continues to have a speech right. The change probability P=1 means that the speech right is transferred from the user to the interactive robot 100. The change probability P is calculated as a value in the range between 0 or greater and 1 or less. Therefore, as the change probability P approaches 0, it is strongly estimated that the user continues to have the speech right, while as the change probability approaches 1, it is strongly estimated that the speech right is transferred from the user to the interactive robot 100.

The estimation unit 230 is connected to a prosody DB 310. The prosody DB 310 is, for example, a recording medium of a hard disk drive. The prosody DB 310 stores a lookup table or an evaluation function indicating a magnitude of an influence of the features representing the prosody on the change probability by showing specific numerical values of the features and the change probability. The estimation unit 230 uses the lookup table of the prosody or the evaluation function of the prosody DB 310 to convert the physical features of the prosody received from the analysis unit 220 into evaluation values and calculates the change probability P by using a method such as multivariate analysis or the like. Cognitive Science Research Paper (2000) and the like disclose details of specific methods for the above calculation.

The estimation unit 230 passes the calculated change probability P to the response control unit 240. When the response control unit 240 is notified about the timing of the break point in the user's speeches by the analysis unit 220, it refers to the change probability P and determines a kind of response to be executed. Then, specific data for executing the determined response is obtained from the output generation unit 250.

In the first embodiment of the present disclosure, the response control unit 240 selects the response from among three responses, which are: "make no response"; "make a filler utterance"; and "make a response speech" according to the value of the change probability P. The "make no response" is a response indicating to make no particular response. However, formally, the response control unit 240 refers to the output generation unit 250 for setting a non-speech time or the like.

When the response control unit 240 determines to "make a filler utterance", it causes a filler generation unit 251 implemented as one function of the output generation unit 250 to generate a filler. The filler is a connecting utterance which is irrelevant to an interaction content. Examples of the filler is "ah, "umm", "so", and "I mean". These fillers are stored in a filler DB 320 as reproducible utterance data.

The filler DB 320 is connected to the filler generation unit 251. The filler DB 320 is composed of, for example, a recording medium of a hard disk drive. The filler generation unit 251 generates the filler by, for example, randomly extracting the utterance data stored in the filler DB 320 according to a request from the response control unit 240 and passes the extracted utterance data to the response control unit 240.

When the response control unit 240 determines "make a response speech", it causes the response generation unit 252 implemented as one function of the output generation unit 250 to generate a response speech. The response speech is a speech that responds as an interaction having meaning to a content of the user's speech.

A speech DB 330 is a database connected to the response generation unit 252. The speech DB 330 is composed of, for example, a recording medium of a hard disk drive. The speech DB 330 is organized, for example, into a corpus. The speech DB 330 stores individual terms together with the reproducible utterance data. The response generation unit 252 collects the speech data from the speech DB 330 according to a request from the response control unit 240, constructs a sentence established as a conversation, and passes the sentence to the response control unit 240.

The response generation unit 252 passes the filler utterance data and the response speech data generated by the output generation unit 250 to the speech output unit 260. The speech output unit 260 includes the speaker 112. The speech output unit 260 converts the filler utterance data and the response speech data received from the response generation unit 252 into analog signals and outputs them as sound from the speaker 112.

FIG. 3 is a diagram showing a response determination table according to the first embodiment. As shown in FIG. 3, when the change probability P is 0.0 or greater and less than 0.5, the response control unit 240 determines to "make no response". Likewise, when the change probability P is 0.5 or greater and less than 0.8, the response control unit 240 determines to "make a filler utterance". Similarly, when the change probability P is 0.8 or greater and 1.0 or less, the response control unit 240 determines to "make a response speech". In this manner, the kind of response made by the response control unit 240 is previously determined as a category rule according to the value of the change probability P.

The category rule shown in FIG. 3 defines a range of the change probability P, in which the interactive robot 100 should wait for an input of the input speech by the speech input unit 210, i.e., the interactive robot 100 should wait for the user to speak, to be 0.0 or greater and less than 0.5. Likewise, the category rule defines a range of the change probability P, in which the speech output unit 260 should output an output speech, i.e., the interactive robot 100 itself should make a speech having a meaning content, to be 0.8 or greater and 1.0 or less. Further, the category rule defines a range between the above two ranges, namely, a range between 0.5 or greater and less than 0.8, as a range where it is not possible to estimate whether to wait for an input of the input speech by the speech input unit 210 or to execute an output of the output speech by the speech output unit 260.

In the this embodiment, when it is not possible to estimate whether the interactive robot 100 should wait for an input of an input speech or execute an output of an output speech, the filler utterance is made to prevent silence between the interactive robot 100 and the user from continuing or the user's speech from overlapping the interactive robot 100's speech. The filler utterances are known to have an effect of implying to a conversation partner that a speaker who made the filler utterance has the speech right.

Figure 4:
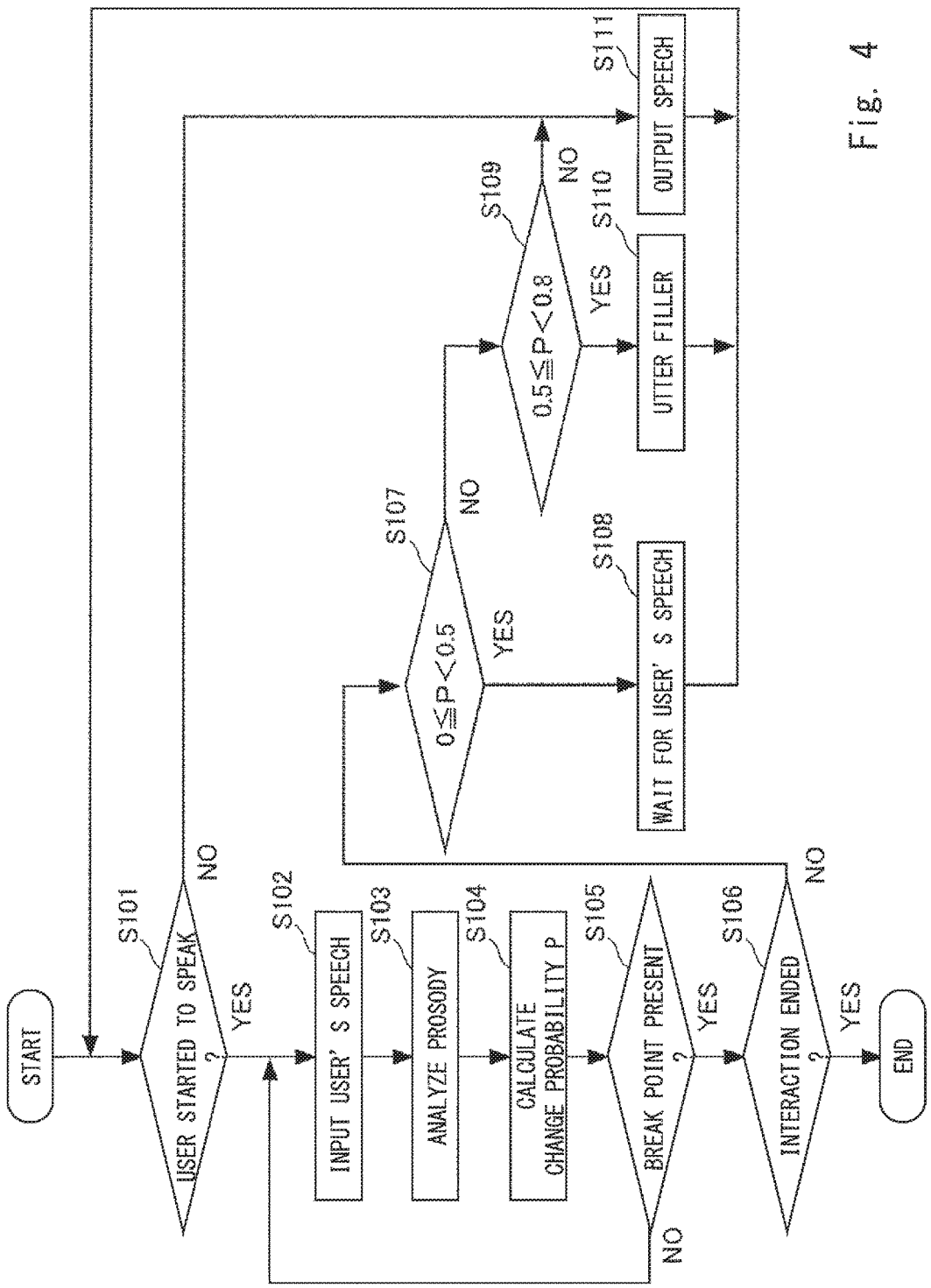
FIG. 4 is a diagram showing an interaction processing flow according to the first embodiment.

FIG. 4 is a diagram showing an interaction processing flow according to the first embodiment. The interaction processing flow shown in FIG. 4 is started upon detecting a start of an interaction such as an operation of a switch.

In Step S101, the response control unit 240 evaluates as to whether or not the user has started speaking. Specifically, for example, the response control unit 240 monitors AD conversion outputs of the speech input unit 210 to make the evaluation. If the response control unit 240 evaluates that the user has started speaking, the process proceeds to Step S102.

In Step S102, the speech input unit 210 inputs a user's speech, converts it into digital signals, and passes them to the analysis unit 220. In Step S103, the analysis unit 220 analyzes the prosody from the digital signals received from the speech input unit 210 and passes the calculated features to the estimation unit 230. In Step S104, the estimation unit 230 calculates the change probability P using the features of the prosody received from the analysis unit 220 and passes the change probability P to the response control unit 240.

In Step S105, the response control unit 240 evaluates as to whether or not there is the break point in the user's speech. Specifically, when timing information on the break point is received from the analysis unit 220, the point indicated by the timing information is evaluated as being the break point. When the response control unit 240 evaluates that there is no break point, the process returns to Step S102 to further accept the user's speeches. When the response control unit 240 determines that there is the break point, the process proceeds to Step S106.

In Step S106, the response control unit 240 evaluates as to whether or not the interaction has ended. For example, when the user says "goodbye" or when the user operates an end button, the response control unit 240 evaluates that the interaction has ended, and ends the series of processes. When the response control unit 240 cannot evaluate that the interaction has ended, the process proceeds to Step S107 to continue the interaction.

The process from Step S107 is a process for a response selection. In Step S107, the response control unit 240 evaluates as to whether or not the change probability P falls within the range between 0.0 or greater and less than 0.5. If the response control unit 240 evaluates that the change probability P falls within this range, the process proceeds to Step S108 to wait for the user's next speech. For example, the process waits for a predetermined period of time. Then, the process returns to Step S101 to evaluate as to whether or not the user started to speak during this period, and the series of processes is executed again.

If the response control unit 240 evaluates that the change probability P does not fall within the range between 0.0 or greater and less than 0.5 in Step S107, the process proceeds to Step S109 to evaluate as to whether or not the change probability P falls within the range between 0.5 or greater and less than 0.8. If the response control unit 240 evaluates that the change probability P falls within this range, the process proceeds to Step S110 to make a filler utterance. When the filler utterance is ended, the process returns to Step S101, and the response control unit 240 evaluates as to whether or not the user has started to speak within the predetermined period of time and executes the series of processes again.

If the response control unit 240 evaluates that the change probability P does not fall within the range between 0.5 or greater and less than 0.8 in Step S109 or if the response control unit 240 evaluates that the user did not start to speak within the predetermined time of period in Step S101, the process proceeds to Step S111 to generate the response speech data and execute an output of the speech. When the output of the speech is ended, the process returns to Step S101 to evaluate as to whether or not the user has started to speak within the predetermined period of time, and the series of processes is executed again.

As described above, by executing the filler utterance when it is not possible to estimate whether to wait for the input of the input speech or to execute the output of the output speech, it can be expected to contribute to a smooth interaction without a moment of giving an unnatural impression.

Next, a second embodiment of the present disclosure will be described. An apparatus configuration of an interactive robot 100 according to the second embodiment is the same as that of the first embodiment, and the process of flow of the second embodiment slightly differs from that of the first embodiment.

FIG. 5 is a diagram showing a response determination table according to the second embodiment. In the first embodiment, the range of the change probability P evaluated to "make a filler utterance" and the range of the change probability P evaluated to "make a response speech" did not overlap each other. In the second embodiment, a range that overlaps both of the above change probabilities P is provided. Specifically, when the change probability P is 0.5 or greater and less than 0.8, it is determined to "make a filler utterance", and when the change probability P is 0.7 or greater and 1.0 or less, it is determined to "make a response speech". When the change probability P is 0.0 or greater and less than 0.5, it is determined to "make no response" as in the first embodiment.

That is, when the change probability P is 0.7 or greater and less than 0.8, the change probability P belongs to two categories: "make a filler utterance" and "make a response speech". This is a measure to support experiment results revealing that in a situation of an interaction where the change probability P is 0.7 or greater and less than 0.8, there are mixed cases where it is better to be evaluated to make a filler utterance and where it is better to be evaluated to make a response speech.

Figure 6:
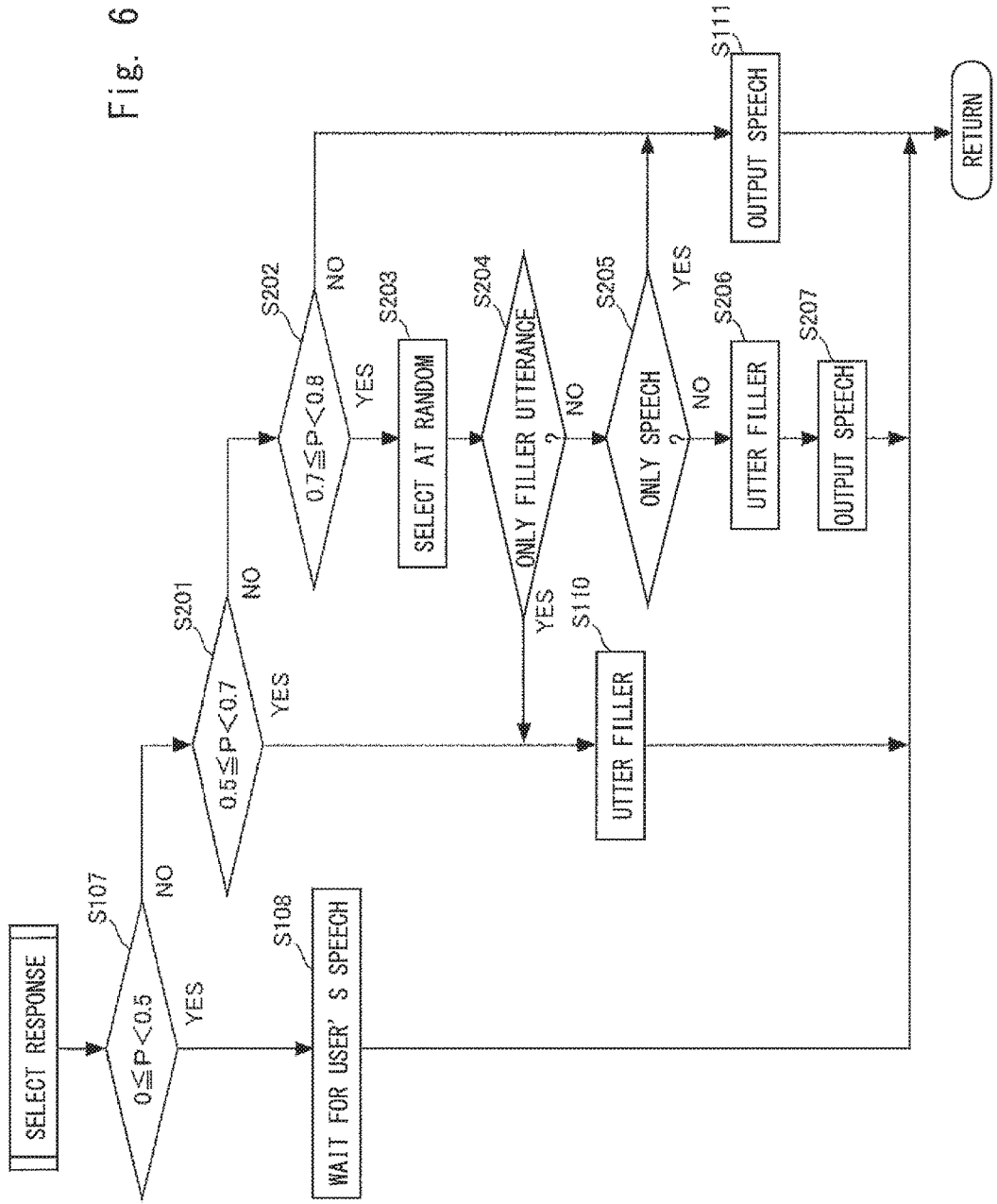
FIG. 6 is a diagram showing a characterizing part of the interaction processing flow according to the second embodiment.

Processing when the response determination table is determined in this manner will be described below. FIG. 6 is a diagram showing a characterizing part of the interaction processing flow according to the second embodiment. The interaction processing flow according to the second embodiment is the same as the processing described with reference to FIG. 4 except for the process of the response selection. Only the differences between the processing in FIGS. 4 and 6 will be described here. In FIG. 6, the same steps as those in FIG. 4 are denoted by the same step numbers, and detailed descriptions thereof will be omitted.

Steps S107 and S108, which are processing when the change probability P is 0.0 or greater and less than 0.5, are the same as those in the first embodiment. If the change probability P falls within the range between 0.0 or greater and less than 0.5, the response control unit 240 waits for the user's speech (Step S108), and the process returns to Step S101.

In Step S201, the response control unit 240 evaluates as to whether or not the change probability P falls within the range between 0.5 or greater and less than 0.7. If the change probability P falls within this range, it belongs only to "make a filler utterance". Thus, the response control unit 240 executes a filler utterance (Step S110), and the process returns to Step S101.

In Step S202, the response control unit 240 evaluates as to whether or not the change probability P falls within the range between 0.7 or greater and less than 0.8. If the change probability P falls within this range, the process proceeds to Step S203 where the response control unit 240 randomly selects one of "only make a filler utterance", "only make a response speech", and "make both a filler utterance and a response speech". If "only make a filler utterance" is selected, the process proceeds to Step S110 via Step S204 (YES). If "only make a response speech" is selected, the process proceeds to Step S111 via Steps S204 (NO) and S205 (YES). In Step S111, the response control unit 240 generates the response speech data and executes an output of a speech. When the output of the speech is ended, the process returns to Step S101.

If the response control unit 240 selects "make both a filler utterance and a response speech", the process proceeds to Step S206 via Steps S204 (NO) and S205 (NO). The response control unit 240 makes a filler utterance in Step S206 and then outputs a response speech in Step S207. After that, the process returns to step S101.

As described above, according to this embodiment, by randomly changing the response when the situation of the interaction is not clear, a smooth interaction, which does not give a mechanical impression, can be expected. By outputting the response speech following the filler utterance, even when the interactive robot 100's speech overlaps the user's speech, it will be the filler that overlaps the user's speech. Therefore, it can be said that an unfavorable influence of the overlap on the interaction is relatively small.

Next, a third embodiment of the present disclosure will be described. The filler utterance described in the first and second embodiments is preferably applied to the case when the change probability P is 0.5 or greater. This is because the filler utterance described in the first and second embodiments can be expected to have an effect of implying to the conversation partner that the speaker who made such an utterance has the speech right. However, the range of the change probability P where it is not possible to estimate whether the interactive robot 100 should wait for the input of the input speech or to execute the output of the output speech may include a range between 0.0 and less than 0.5. When the change probability P is less than 0.5, it may be considered preferable to prompt the user to speak.

Figure 7:
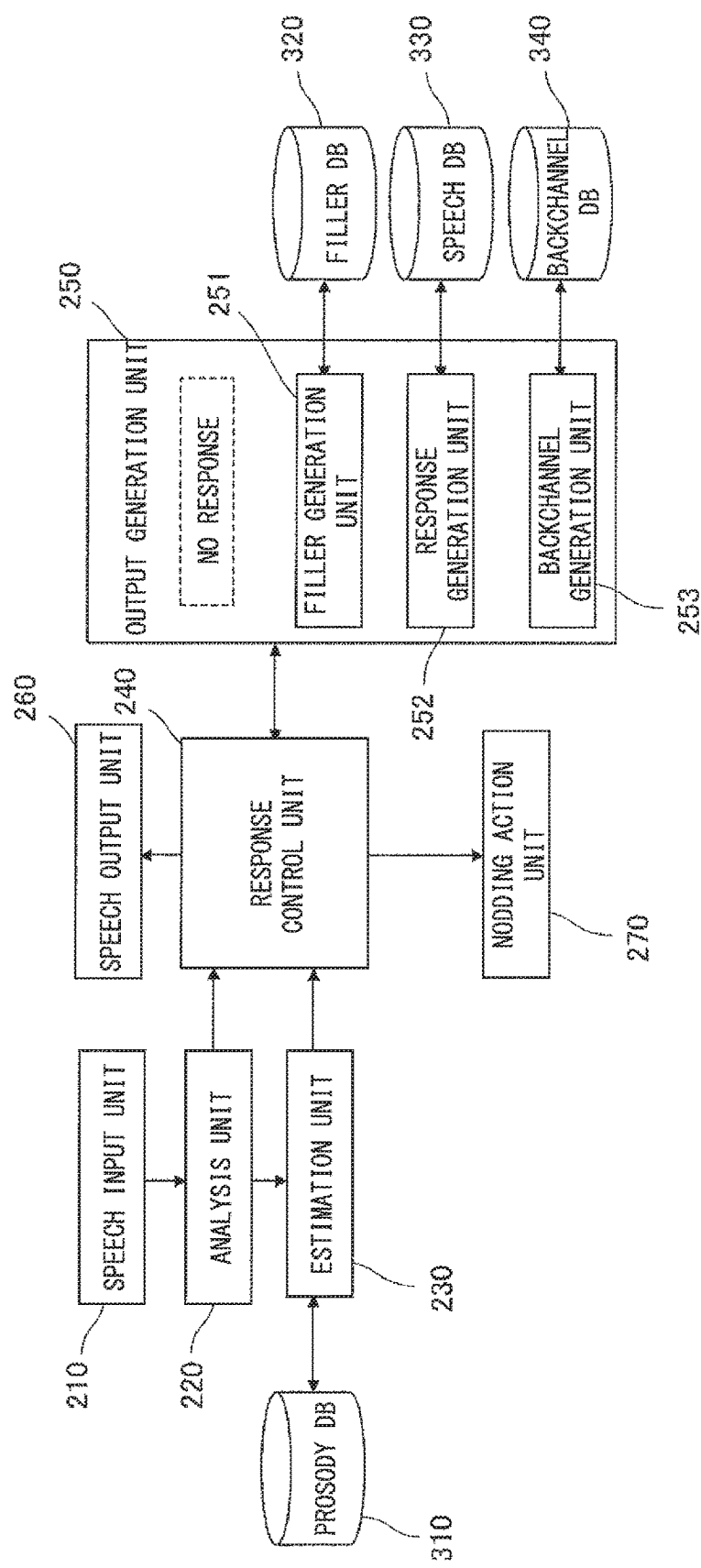
FIG. 7 is a diagram showing a system configuration of an interactive robot according to a third embodiment.

Thus, in the third embodiment, a "nodding action" and a "backchannel response" are introduced in order to execute a process of prompting the user to speak. FIG. 7 is a diagram showing a system configuration of the interactive robot 100 according to the third embodiment. The components in the system configuration shown in FIG. 7 that are same as those of the system configuration shown in FIG. 2 are denoted by the same reference signs as those in FIG. 2. The descriptions of such elements will be thus omitted in the third embodiment.

A difference between the system configuration shown in FIG. 7 and that in FIG. 2 is that the system configuration shown in FIG. 7 further includes a nodding action unit 270 connected to the response control unit 240, a backchannel generation unit 253 included in the output generation unit 250, and a backchannel DB 340 connected to the backchannel generation unit 253. The nodding action unit 270 includes a motor. By driving this motor, the nodding action unit 270 executes an action to swing the head part 110 back and forth to make the interactive robot 100 look like it is nodding to the user.

In the third embodiment, the response control unit 240 may select "make a backchannel utterance" in addition to "make no response", "make a filler utterance", and "make a response speech" according to a value of the change probability P. The backchannel is an utterance prompting the user to make a next speech so that the user feels comfortable in continuing the speech. Examples of the backchannel include "yeah", "that's right", "then?". These backchannels are stored in a backchannel DB 340 as reproducible utterance data.

The backchannel DB 340 is composed of, for example, a recording medium of a hard disk drive. The backchannel generation unit 253 generates the backchannel by, for example, randomly extracting the utterance data stored in the backchannel DB 340 according to a request from the response control unit 240, and passes the extracted utterance data to the response control unit 240.

FIG. 8 is a diagram showing a response determination table according to the third embodiment. In the first embodiment, one category indicating "make no response" is assigned to the range of the change probability P between 0.0 or greater and less than 0.5. However, in the third embodiment, two categories are assigned to this range.

Specifically, as shown in FIG. 8, when the change probability P is 0.0 or greater and less than 0.4, the response control unit 240 determines to "make no response", while when the change probability P is 0.4 or greater and less than 0.5, the response control unit 240 determines to "make a backchannel utterance. Like in the first embodiment, when the change probability P is 0.5 or greater and less than 0.8, the response control unit 240 determines to "make a filler utterance", while when the change probability P is 0.8 or greater and 1.0 or less, the response control unit 240 determines to "make a response speech".

In the third embodiment, a range (first range) where it is not possible to estimate whether to wait for an input of the input speech by the speech input unit 210 or to execute an output of the output speech by the speech output unit 260 is defined as being 0.4 or greater and 0.8 or less. Further, a range (second range) where the interactive robot 100 should wait for the user's speech is defined as being 0.0 or greater and less than 0.4, and a range (third range) where the interactive robot 100 itself should speak is defined as being 0.8 or greater and 1.0 or less. In addition, the first range is further divided into a range close to the second range (0.4 or greater and less than 0.5) If a range close to the third range (0.5 or greater and less than 0.8). When the change probability P falls within the first range and the range in the first range close to the second range, "make a backchannel utterance" is carried out, while if the change probability P falls within the first range and the range in the first range close to the third range, "make a filler utterance" is carried out. The "make a backchannel utterance" may be carried out together with "perform a nodding action" or "perform a nodding action" may be carried out instead of "make a backchannel utterance".

Figure 9:
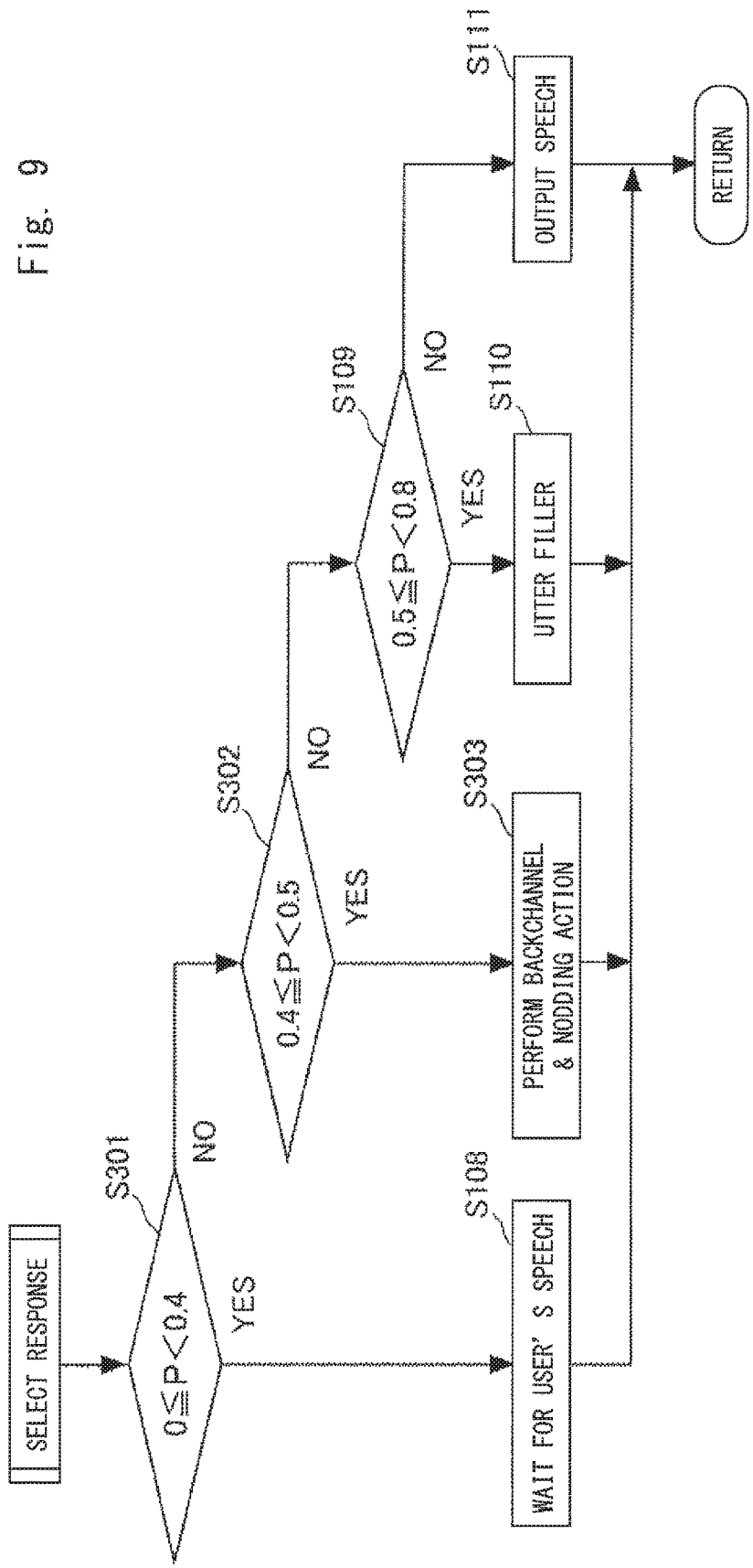
FIG. 9 is a diagram showing a characterizing part of an interaction processing flow according to the third embodiment.

Processing when the response determination table is determined in this manner will be described below. FIG. 9 is a diagram showing a characterizing part of the interaction processing flow according to the third embodiment. The interaction processing flow according to the third embodiment is the same as the processing described with reference to FIG. 4 except for the process of the response selection. Only the differences between the processing in FIGS. 4 and 9 will be described here. In FIG. 9, the same steps as those in FIG. 4 are denoted by the same step numbers, and detailed descriptions thereof will be omitted.

Firstly in Step S301, the response control unit 240 evaluates as to whether or not the change probability P falls within the range between 0.0 or greater and less than 0.4. If the change probability P falls within this range, the interactive robot 100 waits for the user's speech (Step S108), and the process returns to Step S101.

In Step S302, the response control unit 240 evaluates as to whether or not the change probability P falls within the range between 0.4 or greater and less than 0.5. If the change probability P falls within this range, the process proceeds to Step S303, and the response control unit 240 executes the nodding action together with "make a backchannel utterance". When this processing is ended, the process returns to Step S101. The processing when the change probability P is 0.5 or greater and less than 0.8 and the processing when the change probability P is 0.8 or greater and 1.0 or less are the same as those in the first embodiment.

As described above, according to this embodiment, when it is not possible to estimate whether the interactive robot 100 should wait for the input of the input speech or execute the output of the output speech, and when it may be preferable to prompt the user to speak, a smooth interaction can be expected by making the backchannel utterance and performing the nodding action.

Next, a fourth embodiment will be described. FIG. 10 is a diagram showing a response determination table according to the fourth embodiment. In the fourth embodiment, like the second embodiment, the range of the change probability P evaluated to "make a filler utterance" partially overlaps with the range of the change probability P evaluated to "make a response speech". Further, the range of the change probability P evaluated to "make no response" partially overlaps the range of the change probability P evaluated to "make a backchannel utterance". To be more specific, when the change probability P is 0.0 or greater and less than 0.4, the response control unit 240 determines to "make no response", while when the change probability P is 0.3 or greater and 0.5 or less, the response control unit 240 determines to "make a backchannel utterance". Like in the second embodiment, when the change probability P is 0.5 or greater and less than 0.8, the response control unit 240 determines to "make a filler utterance", while when the change probability P is 0.7 or greater and 1.0 or less, the response control unit 240 determines to "make a response speech".

That is, when the change probability P is 0.3 or greater and less than 0.4, the change probability P belongs to two categories: "make no response" and "make a backchannel utterance". This is a measure to support experiment results revealing that in a situation of an interaction where the change probability P is 0.3 or greater and less than 0.4, there are mixed cases where it is better to be evaluated to make no response and where it is better to be evaluated to make a backchannel utterance. When the change probability P is 0.3 or greater and less than 0.4, the response control unit 240 randomly selects "make no response" or "make a backchannel utterance" and executes the selected action. Processing when "make a backchannel utterance" selected is the same as that of Step S303 in FIG. 9.

Note that to "make a backchannel utterance" is intended to prompt the user to speak, while to "make a filler utterance" is intended to imply to a conversation partner that the speaker who made the filler utterance has the speech right. Accordingly, it is preferable not to make the range of the change probability P evaluated to "make a backchannel utterance" overlap the range of the change probability P evaluated to "make a filler utterance". As described above, in this embodiment, by making various changes in the response using the value of the change probability P when the situation of the interaction is not clear, a smooth interaction, which does not give a mechanical impression, can be expected.

Next, a fifth embodiment will be described. An apparatus configuration of an interactive robot 100 according to the fifth embodiment is the same as that of the first embodiment. A difference between the fifth embodiment and the first embodiment is that in the fifth embodiment, the ranges of the change probability P in the response determination table are dynamically changed. The response determination table of the first embodiment is as shown in FIG. 3, but in the response determination table of this embodiment, a variable value Xp is used for a boundary value between "make a filler utterance" and "make a response speech", namely, 0.8. An initial value shall be 0.8.

Figure 11:
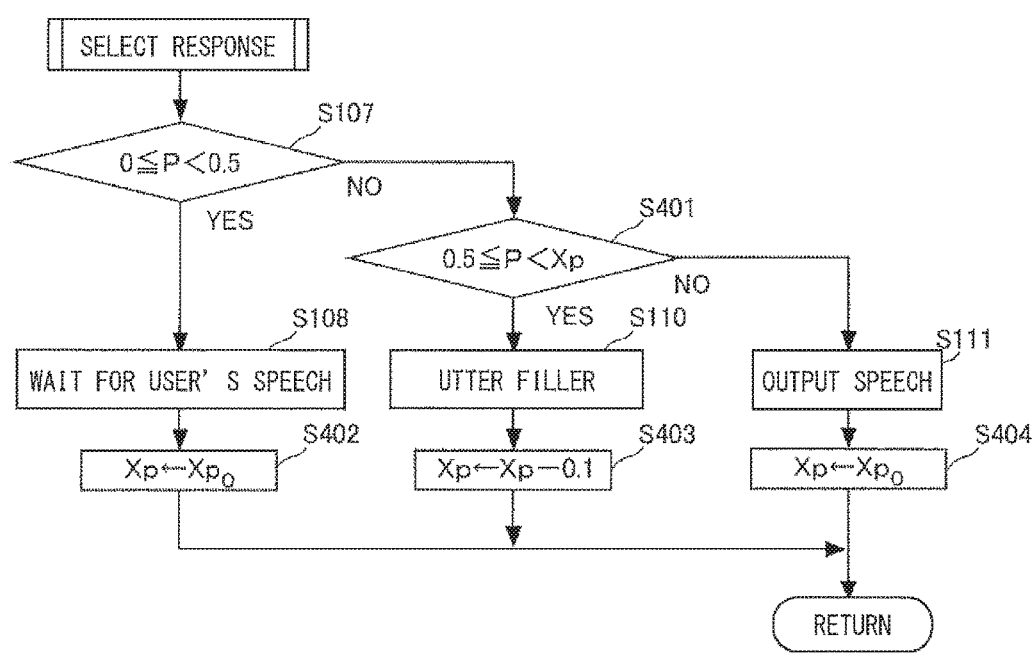
FIG. 11 is a diagram showing a characterizing part of an interaction processing flow according to a fifth embodiment.

FIG. 11 is a diagram showing a characterizing part of the interaction processing flow according to the fifth embodiment. The interaction processing flow according to the fifth embodiment is the same as the processing described with reference to FIG. 4 except for the process of the response selection. Only the differences between the processing in FIGS. 4 and 11 will be described here. In FIG. 11, the same steps as those in FIG. 4 are denoted by the same step numbers, and detailed descriptions thereof will be omitted.

The processing of Steps S107 and S108 when the change probability P is 0.0 or greater and less than 0.5 is the same as that in the first embodiment. When the change probability P falls within the range between 0.0 or greater and less than 0.5, the response control unit 240 waits for the user's speech (Step S108). Then, the process proceeds to Step S402 where $Xp_0$, which is an initial value, is assigned to Xp. As mentioned above, $Xp_0$ is 0.8 in this example. After that, the process returns to Step S101. Note that the order of the Steps S108 and S402 may be reversed.

If the change probability P is evaluated that it does not fall within the range between 0.0 or greater and less than 0.5 in Step S107, the process proceeds to Step S401 where the response control unit 240 evaluates as to whether or not the change probability P falls within the range between 0.5 or greater and less than Xp. If the response control unit 240 evaluates that the change probability P falls within this range, the process proceeds to Step S110 to execute a filler utterance. When the filler utterance is ended, the process proceeds to Step S403 where the value of Xp is updated with a value obtained by subtracting 0.1 from the current value of Xp. Then, the process returns to Step S101. Note that the order of the Steps S110 and S403 may be reversed.

If the response control unit 240 evaluates that the change probability P does not fall within the range between 0.5 or greater and less than Xp in Step S401, the process proceeds to Step S111 and executes an output of the speech. When the output of the speech is ended, the process proceeds to Step S404 where the initial value, $Xp_0$, is assigned to Xp. Then, the process returns to Step S101. Note that the order of the Steps S111 and S404 may be reversed.

According to this processing flow, every time the processing is looped and the filler utterance is made, the range of the change probability P, which is the condition guided to Step S110, becomes narrower, and the possibility that the processing of Step S111 is executed, i.e., a speech is output, becomes greater. In other words, when the filler utterance is continued without the user making a speech or the interactive robot 100 making a response speech, it can be said that the estimation unit 230 is more likely to estimate that the output of the speech should be executed. By doing so, it can be expected to avoid situations that give an unnatural impression such that only fillers are uttered in an interaction. If the updated value of Xp is 0.5 or less, Xp is fixed to 0.5 which is a lower limit value. In this case, the filler utterance is virtually prohibited. Further, the value to subtract is not limited to 0.1 and may be adjusted to other values. Furthermore, instead of adjusting the range of the change probability P, a variable for counting the number of times the filler utterance is made may be set, and when this variable reaches a predetermined number of times, the filler utterance may be prohibited.

Next, a sixth embodiment will be described.

An apparatus configuration of an interactive robot 100 according to the six embodiment is the same as that of the first embodiment. A difference between the six embodiment and the first embodiment is that in the sixth embodiment, the ranges of the change probability P in the response determination table are dynamically changed. The response determination table of the first embodiment is as shown in FIG. 3, but in the response determination table of this embodiment, a variable value Xq is used for a boundary value between "make no response" and "make a filler utterance", namely, 0.5. An initial value shall be 0.5.

Figure 12:
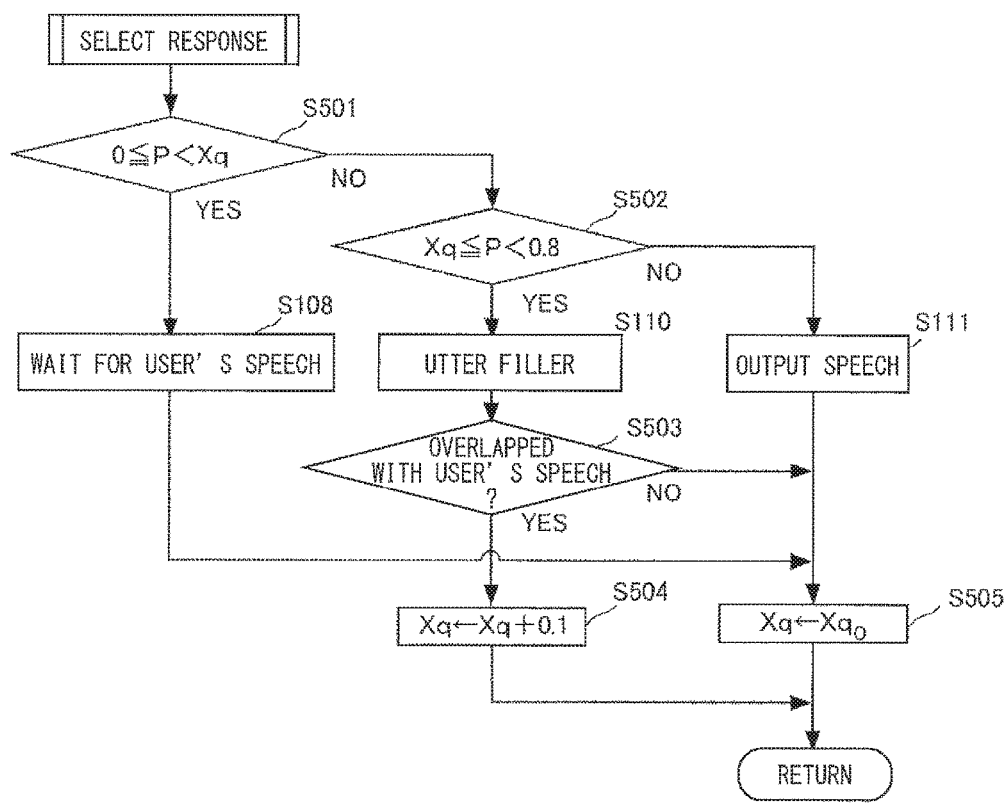
FIG. 12 is a diagram showing a characterizing part of an interaction processing flow according to a sixth embodiment.

FIG. 12 is a diagram showing a characterizing part of the interaction processing flow according to the sixth embodiment. The interaction processing flow according to the sixth embodiment is the same as the processing described with reference to FIG. 4 except for the process of the response selection. Only the differences between the processing in FIGS. 4 and 12 will be described here.

In Step S501, the response control unit 240 evaluates as to whether or not the change probability P falls within the range between 0.0 or greater and less than Xq. When the change probability P falls within the range between 0.0 or greater and less than Xq, the response control unit 240 waits for the user's speech (Step S108). Then, the process proceeds to Step S505 where the initial value, $Xq_0$, is assigned to Xq. As mentioned above, $Xq_0$ is 0.5 in this example. Then, the process returns to Step S101. Note that the order of the Steps S108 and S505 may be reversed.

If the response control unit 240 evaluates that the change probability P does not fall within the range between 0.0 or greater and less than Xq in Step S501, the process proceeds to Step S502 where it evaluates as to whether or not the change probability P falls within the range between Xq or greater and less than 0.8. If the response control unit 240 evaluates that the change probability P falls within this range, the process proceeds to Step S110 to make a filler utterance. The response control unit 240 evaluates as to whether or not the user's speech has overlapped the filler utterance while making the filler utterance (Step S503). Specifically, for example, the response control unit 240 monitors AD conversion outputs of the speech input unit 210 to make the evaluation. If the response control unit 240 evaluates that the user's speech has overlapped the filler utterance, the process proceeds to Step S504 where the value of Xq is updated with a value obtained by adding 0.1 to the current value of Xq. Then, the process returns to Step S101. If the response control unit 240 evaluates that the user's speech has not overlapped the filler utterance, the process proceeds to S505, and the initial value, Xq0, is assigned to Xq.

If the response control unit 240 evaluates that the change probability P does not fall within the range between Xq or greater and less than 0.8 in Step S502, the process proceeds to Step S111 where it executes an output of the speech. When the output of the speech is ended, the process proceeds to Step S505 where the initial value, Xq0, is assigned to Xq. Then, the process returns to Step S101. Note that the order of the Steps S111 and S505 may be reversed.

According to this processing flow, every time the processing is looped and the filler utterance overlaps the user's speech, the range of the change probability P, which is the condition guided to Step S110, becomes narrower, and the possibility that the processing of Step S108, "make no response", is executed becomes greater. In other words, when the user's speech is detected while making the filler utterance, the estimation unit 230 is more likely to estimate that the interactive robot 100 should wait for the user's speech. That is, a situation where the filler utterance overlap the user's speech continues is a situation where both the user and the interactive robot 100 assert the speech right. In order to avoid such a situation, the interactive robot 100 increases the proportion of "make no response" so that the user feels more comfortable to speak. By such processing, it can be expected to avoid situations where the interaction is interrupted. If the updated value of Xq is 0.8 or greater, Xq is fixed to 0.8 which is an upper limit value. In this case, the filler utterance is virtually prohibited. Further, the value to add is not limited to 0.1 and may be adjusted to other values.

Furthermore, instead of adjusting the range of the change probability P, a variable for counting the number of times the filler utterance overlaps the user's speech may be set, and when this variable reaches a predetermined number of times, the filler utterance may be prohibited.

Although the fifth and sixth embodiments described above are based on the first embodiment, they may be combined with the second to fourth embodiments by appropriately adjusting the numerical values. Further, the fifth and sixth embodiments may be combined with each other.

In the third and fourth embodiments, it has been described that both the backchannel utterance and the nodding action are executed, but either one of them may be executed. The nodding action unit 270 may be deleted if the processing of the nodding action is omitted. In the third and fourth embodiments, the range of the change probability P for "make a backchannel utterance" and the range of the change probability P for "make a filler utterance" are provided in the response determination table. However, the range of the change probability P for "make a filler utterance" may be deleted. In this case, the range of the change probability P for "make a response speech" may be set to 0.5 or greater and 1.0 or less.

Figure 13:
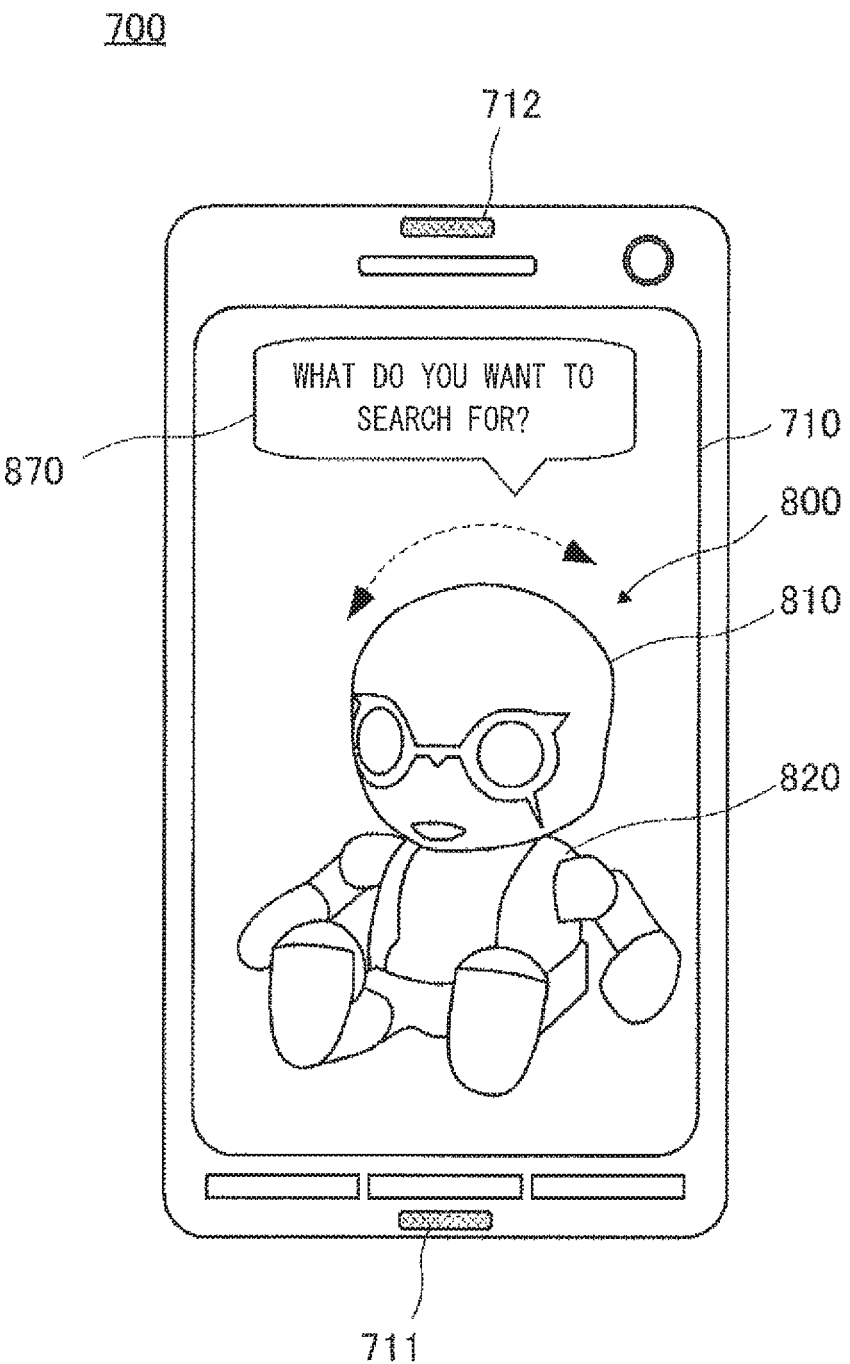
FIG. 13 is a diagram showing an external appearance of a smartphone according to other embodiments.

In the above-described embodiments, the interactive robot 100 has been described as a voice interaction apparatus. However, the voice interaction apparatus may not necessarily have a three-dimensional structure simulating a humanoid and can adopt various forms. FIG. 13 is a diagram showing an external appearance of a smartphone 700 according to other embodiments.

The smartphone 700 serves as a voice interaction apparatus with normal functions as a smartphone. The smartphone 700 includes a display unit 710, a microphone 711, and a speaker 712. The microphone 111 functions in the same way as the microphone 111 of the interactive robot 100. The speaker 712 functions in the same way as the speaker 112 of the interactive robot 100. Further, the smartphone 700 includes the system configuration shown in FIG. 2.

The response control unit 240 may display a character 800 representing, for example, a robot in CG on the display unit 710. Like the interactive robot 100, the character 800 has a head part 810 and a body part 820. The response control unit 240 displays animations of swinging the head unit 810 back and forth when it executes the nodding action Additionally, the response control unit 240 may display a balloon 870 on the display unit 710 to inform the user of a filler utterance and a response speech in text. In this case, the function of outputting the filler utterance and the response speech in sound from the speaker 712 may be deactivated.

In the above-described embodiments, the change probability P is calculated as the estimation value. However, the estimation method for estimating whether the interactive robot 100 should wait for the user's speech or the interactive robot 100 itself should speak based on the received physical features representing the prosody is not limited to using a numerical value as the estimation value. For example, one of the four, which are "make no response", "make a filler utterance", "make a response speech", and "make a backward utterance" may be directly output based on the received physical features representing the prosody. Each group may be regarded as a class, and the method such as depth learning may be used to evaluate which class the input prosody belongs to.

In the above-described embodiments, the interactive robot 100 or the smartphone 700 has been described as including the system configuration shown in FIG. 2 or 7. However, some components may be disposed in an external device, and information may be obtained from outside by communication. For example, each of the prosody DB 310, the filler DB 320, the utterance DB 330, and the backchannel DB 340 may be a shared database provided as an external device. The interactive robot 100 or the smartphone 700 uses a communication function to request information necessary for the database as necessary. In this manner, if a database requiring a large capacity recording medium is provided externally, it is possible to easily optimize the system configuration as a voice interaction apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice interaction apparatus comprising:
an interactive robot comprising:
a pseudo head;
a microphone configured to detect an input speech spoken by a user;
a speaker configured to output an output speech spoken to the user; and
a processor configured to:
estimate a change probability that indicates whether to wait for the input of the input speech by the microphone, or to execute the output of the output speech by the speaker, based on the input speech detected by the microphone; and
if the change probability falls within a predetermined subset range, control the voice interaction apparatus to respond by executing at least one of a filler output and a nodding action,
wherein the filler output is an output of a filler from the speaker, the filler being a connecting utterance irrelevant to an interaction content, and
wherein the nodding action is an action of swinging the pseudo head back and forth.

2. The voice interaction apparatus according to claim 1, wherein the processor is further configured to analyze prosody of the input speech detected by the microphone, wherein the processor is configured to estimate whether to wait for the input of the input speech by the microphone or to execute the output of the output speech by the speaker based on the prosody analyzed by the processor.

3. The voice interaction apparatus according to claim 1, wherein when the change probability falls within the predetermined subset range and is smaller than a first threshold set in the predetermined subset range, the processor responds by executing the nodding action, while when the change probability is greater than a second threshold that is set in the predetermined subset range and that is greater than or equal to the first threshold, the processor responds by executing the filler output.

4. The voice interaction apparatus according to claim 1, wherein when the processor continuously executes the filler output without executing the output of the output speech by the speaker, the processor is more likely to estimate that the output of the output speech should be executed.

5. The voice interaction apparatus according to claim 1, wherein when the input of the input speech by the microphone is detected while executing the filler output, the processor is more likely to estimate that the input of the input speech is being waited for.

6. An automatic interaction method using a voice interaction apparatus including a microphone configured to detect an input speech spoken by a user and a speaker configured to output an output speech spoken to the user, the automatic interaction method comprising:
- estimating, with a processor, a change probability that indicates whether to wait for the input of the input speech by the microphone or to execute the output of the output speech by the speaker based on the input speech detected by the microphone;
- determining, with the processor, that the change probability falls within a predetermined subset range; and
- responding by executing, when the change probability falls within the predetermined subset range, at least one of a filler output and a nodding action, the filler output being an output of a filler from the speaker,
- wherein the voice interaction apparatus is an interactive robot that further includes a pseudo head,
- wherein the filler is a connecting utterance irrelevant to an interaction content, and
- wherein the nodding action is an action of swinging the pseudo head back and forth.

* * * * *